US005995456A

United States Patent [19]

Brewer et al.

[11] Patent Number: 5,995,456

[45] **Date of Patent: *Nov. 30, 1999**

[54] DYNAMICALLY CHANGING LIQUID CRYSTAL DISPLAY TIMEKEEPING APPARATUS

[75] Inventors: Donald R. Brewer, Hermosa Beach; Michael Jarcho, La Mesa, both of Calif.

[73] Assignee: Boit Incorporated, San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,725

[22] Filed: May 30, 1997

Related U.S. Application Data

[63] Continuation-in-part of application No. 08/402,008, Mar. 10, 1995, Pat. No. 5,636,185.

[51] Int. Cl.[6] .......................... G04B 19/06; G04C 19/00; G02F 1/37

[52] U.S. Cl. .......................... 368/84; 368/232; 368/242; 349/99; 349/165

[58] Field of Search .............................. 368/82–84, 223, 368/228, 232, 239–242; 349/97, 99, 106, 117, 165; 359/85, 98

[56] References Cited

U.S. PATENT DOCUMENTS

| | | | |
|---|---|---|---|
| 3,969,887 | 7/1976 | Fukumoto | 58/50 |
| 4,212,159 | 7/1980 | Noble et al. | 368/82 |
| 4,213,294 | 7/1980 | Freeman | 368/82 |
| 4,385,842 | 5/1983 | Wiesner | 368/242 |
| 4,400,092 | 8/1983 | Piquet et al. | 368/82 |
| 4,413,915 | 11/1983 | Besson | 368/71 |
| 4,435,046 | 3/1984 | Nishimura | 350/334 |
| 4,488,818 | 12/1984 | Saurer et al. | 368/71 |
| 4,647,217 | 3/1987 | Havel | 368/10 |
| 4,707,141 | 11/1987 | Havel | 368/11 |
| 4,933,104 | 6/1990 | Ivaschenko et al. | 252/299.1 |
| 5,008,869 | 4/1991 | Dweck | 368/228 |
| 5,008,870 | 4/1991 | Vessa | 368/242 |
| 5,228,013 | 7/1993 | Bik | 368/223 |
| 5,289,301 | 2/1994 | Brewer | 359/98 |
| 5,418,760 | 5/1995 | Kawashima et al. | 368/69 |
| 5,455,808 | 10/1995 | Grupp et al. | 368/82 |

FOREIGN PATENT DOCUMENTS

| | | |
|---|---|---|
| 0539333 | 4/1993 | European Pat. Off. . |
| 3838372 | 5/1990 | Germany . |
| 5380264 | 7/1978 | Japan . |
| 54-027458 | 1/1979 | Japan . |
| 1318992 | 12/1989 | Japan . |

*Primary Examiner*—Vit Miska
*Attorney, Agent, or Firm*—Fitch, Even, Tabin & Flannery

[57] ABSTRACT

A dynamically changing, multi-color liquid crystal display for electronic watches or other design apparel items is provided. The liquid crystal displays incorporated within the watch or designer apparel item can be adapted to provide various colored images such as geometric images, animation images, customized images, designer labels, logos, etc. on colored backgrounds or alternatively provides a color changing capability that is aesthetically pleasing and fashionable. Moreover, the dynamically changing watch or other designer apparel item allows for the electronic control of the color appearance of the liquid crystal displays as well as electronic control of the liquid crystal display images, such images being generally independent of the time of day.

11 Claims, 4 Drawing Sheets

DYNAMICALLY CHANGING LIQUID CRYSTAL DISPLAY TIMEKEEPING APPARATUS

This application is a continuation-in-part of application Ser. No. 08/402,008, filed Mar. 10, 1995, now U.S. Pat. No. 5,636,185.

BACKGROUND OF THE INVENTION

The present invention relates generally to an electronic timekeeping apparatus and/or designer apparel items which exhibit color changes independent of the time of day. More particularly, the invention relates to an electronic timekeeping apparatus or other apparel or novelty item having electronic control means that create dynamic color changes of a liquid crystal display.

A wide variety of electronic timepieces utilizing liquid crystal display elements for time indication have been developed with great commercial success. Most of these electronic timepieces indicate the time in the form of numerals or in what is often referred to as a digital time display. More recently, the related art have fashioned liquid crystal displays for electronic watches that represent time in an analog or conventional type form.

Much of this related art in the field of electronic timekeeping devices with liquid crystal displays offers a variety of designs and configurations of the liquid crystal display elements that dynamically change to indicate the time-of-day. For example, U.S. Pat. No. 3,969,887 issued to Fukumoto (Jul. 20, 1976) shows an electronic timepiece composed of many liquid crystal display elements arranged in hour and minute indicating sections which are selectively activated in various display patterns so that the time is indicated in an analog form.

Another example is U.S. Pat. No. 4,212,159 issued to Nobel et al. (Jul. 15, 1980) which discloses an electronic timepiece with a liquid crystal display simulating a conventional mechanical analog timepiece. The liquid crystal material in Nobel et al. disclosure is activated in selected areas to change the appearance of the display to simulate movement of hands in an analog timepiece.

U.S. Pat. No. 4,213,294 issued to Freeman (Jul. 22, 1980) is one of many United States patents which disclose an electronic timepiece composed of many liquid crystal display elements that when activated simulate the positions of the hour and minute hands in an analog timepiece. Freeman utilizes 24 or 60 individual minute display elements shaped to combine with 12 or 24 hour display elements which are selectively activated to represent the indicated time in analog form.

Other related art includes U.S. Pat. No. 4,385,842 issued to Wiesner (May 31, 1983) which discloses an electronic watch which has a liquid crystal display that presents an analog indication of time in a conventional presentation of hour, minute and second hands that circulate around the watch face. Also, U.S. Pat. No. 4,435,046 issued to Nishimura (Mar. 6, 1984) that utilizes an analog display comprising conventional mechanical hour and minute hands together with a liquid crystal display wherein the activated segments of the liquid crystal display are isolated or separated from the analog display area.

Still other designs have introduced color changing schemes for providing indication of time as is shown in U.S. Pat. No. 4,647,217 (Mar. 3, 1987); and U.S. Pat. No. 4,707,141 (Nov. 17, 1987) both issued to Havel, which show variable color digital and analog timepieces, respectively.

See also U.S. Pat. No. 5,228,013 issued to Bik (Jul. 13, 1993) which utilizes multiple liquid crystal display elements that change color to indicate time in a non-conventional form.

Many existing liquid crystal displays used in timepieces utilize conventional twisted-nematic (TN) displays that generally have a black on grey appearance. In addition, polarizing films, both external and reflective are typically incorporated within such devices which tends to diminish the brightness of the display and limit the viewing angles at which the display is clearly visible. Color appearance of the liquid crystal display is introduced through the use of colored filters, colored background lighting, and the like. However, when the appearance of color is incorporated with such timekeeping devices, the colors are often preselected and static.

The above-described and related references typically employ liquid crystal displays that include static background display elements coupled with active or dynamic time indicating display elements. As such, the aesthetic presentation of the liquid crystal display is limited by the functional aspect of the device.

More recent advancements in liquid crystal displays have disclosed the use of guest dyes within the liquid crystal material to provide color modulation. See for example, U.S. Pat. No. 5,289,301 issued to Donald Brewer (Feb. 22, 1994) which suggests the broad concept of using color modulation liquid crystal displays in a wristwatch in some manner. Such modulation produces a continuous gradual change from one color to another color at a fixed frequency, which fixed frequency is relatable to the time of day, i.e., relatable to the passage of time. The '301 Brewer patent suggests, for example, that the color of a watch face change at a manually-settable fixed rate of between 0.1 Hz to 10 Hz. A rate change at 0.1 Hz, for example, would produce one color change every 10 seconds, while a rate change at 1 Hz would produce one color change every second.

SUMMARY OF THE INVENTION

The present invention is directed to electronic timekeeping apparatus and/or designer apparel items which exhibit color changes independent of the time of day. More particularly, the invention relates to an electronic timekeeping apparatus or other apparel or novelty item having electronic control means that create perceived dynamic color changes within a liquid crystal display that are entertaining and/or interesting to view or experience, but wherein such perceived color changes occur in a pattern or sequence or other arrangement that is independent of the time of day, i.e., wherein the rate, sequence and/or pattern of color changes are not intended to communicate time-of-day information.

The present invention thus comprises a dynamically changing, multi-color liquid crystal display for electronic timepieces and other designer apparel items, e.g., items of jewelry. In general, the multi-color display is realized using: (1) a combination of positive, negative, and/or zero order dyes within an LCD to produce multiple colors in the LCD without the use of a polarizer; or (2) a multicolored LCD (using any type of colored LCD technology) as a watch face (or visible component of other designer apparel items) wherein the color of the LCD dynamically changes independent of the time of day. When implemented as part of a timepiece, e.g., a wrist watch, the watch face has a sealed aperture through which time-indicating hands of an electronic timepiece may extend.

The first technology (combinations of positive, negative, and/or zero order dyes) is implemented using two generally parallel substrates having interior facing surfaces and a plurality of transparent electrodes disposed on the interior faces of the substrates that define liquid crystal display segments. The liquid crystal material incorporates a combination of colored dyes and is generally disposed between the two substrates. This embodiment also includes a electronic driving circuitry for electronically controlling the liquid crystal display segments to change between a first color and a second color and shades of color therebetween by applying prescribed voltages across selected liquid crystal display segments. The liquid crystal displays incorporated within the watch or designer apparel item can be further adapted to provide various colored images such as geometric images, animation images, customized images, and the like on colored backgrounds by properly defining appropriate liquid crystal display segments. When incorporated within a watch, the dynamically changing, multi-color liquid crystal displays can be used with a conventional analog watch having time indicating hands such that the liquid crystal displays are independent of the time of day.

The second technology uses any known, or yet to be discovered, multi-color LCD display or element within a designer apparel item, and includes appropriate electronic circuitry for controlling the color changes so that they occur in a way that is generally independent of the time of day. The color changes may be presented in a way that depicts desired animations, designs, scenes, logos, or the like. Such multi-color changes may be realized, e.g., by using: positive dyes in a liquid crystal host with colored polarizers, a twisted-nematic display with retardation film, or screen printed translucent inks.

Accordingly, it is an object of the invention to provide a multi-color, dynamically changing liquid crystal display for use in watches and similar such designer apparel items.

Another object of the invention is to provide a dynamically changing liquid crystal display watch dial or other designer apparel item that provides electronic control of the color appearance of one or more liquid crystal displays as well as electronic control of multi-colored liquid crystal display images, such images being generally independent of the time of day.

An important feature of the present invention is that the liquid crystal displays incorporated within the watch dial or designer apparel item provides colored segments on colored backgrounds or alternatively provides color variation from one color to another color. Such color changing capability also provides shades of the color combinations in between the two original colors. This feature allows an individual to customize the color appearance of the liquid crystal display.

Another important feature of the present invention is that the liquid crystal displays incorporated within the watch dial or designer apparel item may be segmented and properly driven such that the liquid crystal display images can include a wide variety of multi-colored, customized images. Thus, through use of the present invention, multi-colored liquid crystal displays of animation images, customized images, designer labels, logos, and the like, are made possible.

Still another feature of the present invention, when embodied within a watch or other timepiece, is that it may provide a multi-colored, dynamically changing liquid crystal display that utilizes conventional mechanical hour and minute hands, driven by readily available and ubiquitous electronically-driven timepiece circuits, to represent the indicated time in analog form. Alternatively, another embodiment of the present invention utilizes multi-color liquid crystal display elements which are electronically activated to represent the indicated time in analog form.

An advantage of one embodiment of the invention is that the use of external polarizers may be avoided. This increases the durability, allows wider viewing angles, and enhances the brightness of the present multicolor liquid crystal displays. In other embodiments, polarizers may be used, providing attractive changes in color, accompanied by moving images, in a cost-effective manner.

An important feature of the present invention, in accordance with one embodiment, is the use of a liquid crystal guest-host mixture comprising a negative order parameter dye and a positive order parameter dye, or a negative order parameter dye and a zero order parameter dye, or a positive order parameter dye and a zero order parameter dye to obtain aesthetic effects. In addition, the present invention can be adapted for use with conventional driving schemes used in many existing liquid crystal displays.

Still another feature of the present invention is the optional use of a single chamber liquid crystal display or a multi-chamber liquid crystal display to further customize the colors and images appearing on the watch dial or other designer apparel item. The multi-chamber liquid crystal display device offers an aesthetically pleasing appearance with a multitude of vibrant colors.

Another feature, found in some embodiments of the invention, is the formation of an aperture through the multi-colored, dynamically changing liquid crystal display to accommodate the mechanical hour and minute hands of a conventional analog watch.

BRIEF DESCRIPTION OF THE DRAWINGS

The above and other aspects, features and advantages of the present invention will be more apparent from the following more particular description thereof, presented in conjunction with the following drawings, wherein.

DETAILED DESCRIPTION OF THE PREFERRED EMBODIMENTS

The following description is of the best mode presently contemplated for carrying out the invention. This description is not to be taken in a limiting sense, but is made merely for the purpose of describing the general principles of the invention. The scope of the invention should be determined with reference to the claims.

In the descriptions that follow, the invention is described primarily in connection with a watch, or similar timekeeping apparatus. It is to be understood, however, that the invention may be used with a wide variety of different objects or items of apparel, e.g., items of jewelry, or other designer apparel items, such as bracelets, necklaces, anklets, cuff-links, pins, tie tacks, belt buckles, desk ornaments, and the like. In all such objects or items of apparel, the color changes contemplated by the present invention may occur independent of the time of day. Such changes, in addition to being time-of-day independent, may also be animated or otherwise configured to be very entertaining and enjoyable to watch or experience.

Figure 1:
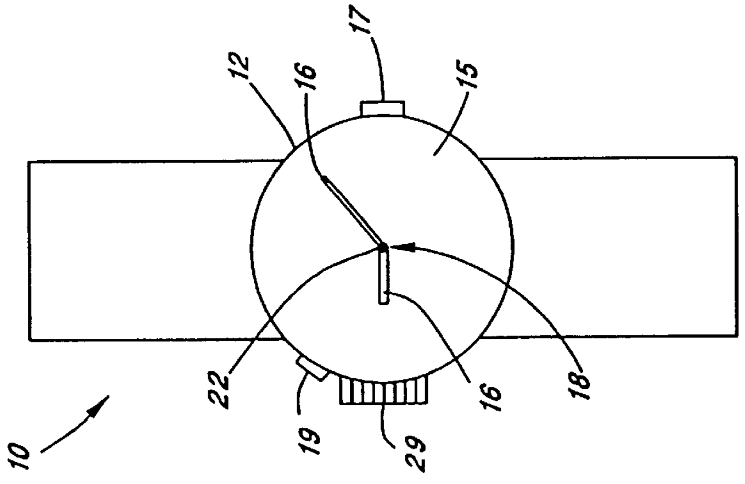
FIG. 1 shows an embodiment of a dynamically changing, multi-color watch having a single chamber liquid crystal display that dynamically changes from a first color to a second color.
Figure 2:
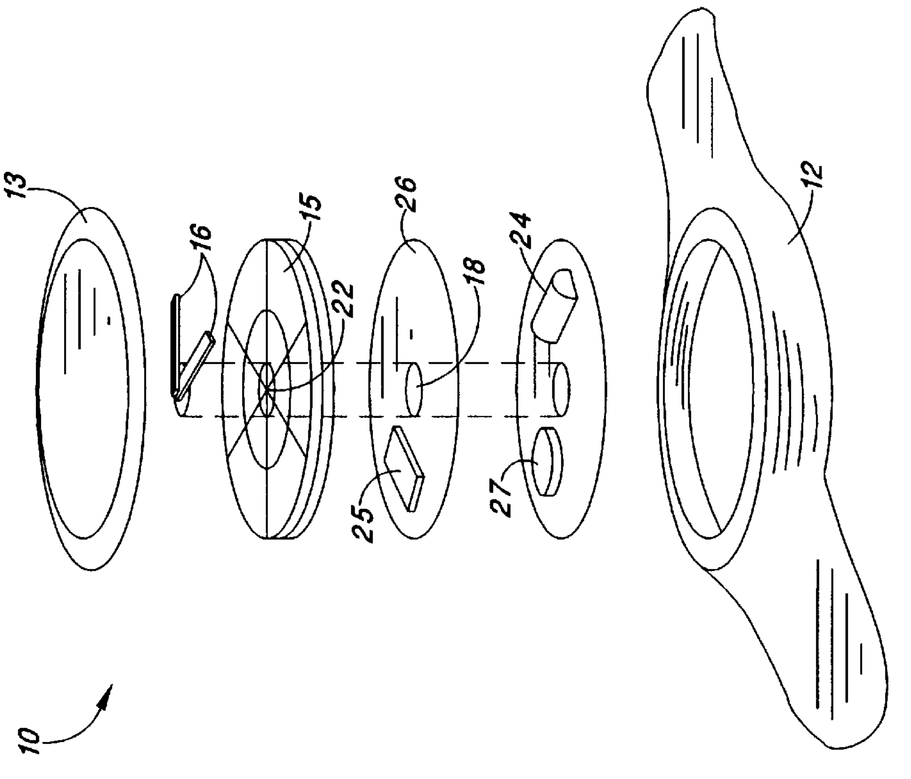
FIG. 2 shows an exploded perspective view of the watch of FIG. 1.

FIGS. 1 and 2 illustrate a dynamically changing, multi-color liquid crystal display watch 10 that includes a watch case 12, a watch cover plate 13, a liquid crystal display watch module 15 adapted for use as a watch dial in a conventional analog watch format, with the dynamically changing multi-color watch dial serving as the novel and distinguishing fashion element. The watch 10 further includes timekeeping control electronics 24 which control the analog movement of conventional mechanical timekeeping hands 16 as a function of the time of day, as is generally known in the art. The mechanical hands 16 will be attached to the movement through a seal-protected hole 18 in the liquid crystal display module 15. The liquid crystal display control electronics comprise a microprocessor 25 disposed on a printed circuit board 26 dimensioned to be placed immediately below the liquid crystal display module 15 and in electrical connection therewith. A common power source, such as a battery 27, is used for both the timekeeping function (i.e. hand movement) and controlling the microprocessor 25 for the liquid crystal display 15.

Several different color changing liquid crystal displays are contemplated for use with the invention. Any type of material that allows the perceived color of the liquid crystal material to change as a function of an applied control voltage, or other electronic control, may be used with the invention. For example, a guest-host liquid crystal display system utilizing a combination of a negative order parameter dye and a positive order parameter dye, or a negative order parameter dye and a zero order parameter dye, or a positive order parameter dye and a zero order parameter may be used. Order parameter in this context indicates where the polarization axis of the dye lies with respect to incident light. Such a display is discussed in detail in U.S. Pat. No. 5,289,301, incorporated by reference herein. The guest-host liquid crystal display disclosed in the '301 patent represents one of the best methods for achieving color change due to its superior brightness, and the inherent advantage of not requiring the use of an external polarizer. Other types of liquid crystal displays that provide the desired color changes are outlined below.

With respect to the method taught in the '301 patent, it is noted that a guest dye with a positive order parameter in a guest-host mixture in a liquid crystal display exhibits a change in color from color to relatively colorless when the voltage applied across the display is raised from a minimum threshold voltage. Conversely, a guest dye with a negative order parameter in a guest-host mixture in a liquid crystal display exhibits a change in color from relatively colorless to color when the voltage applied across the display is raised from a minimum threshold voltage. Finally, a guest dye with a zero order parameter does not exhibit any change in color when the voltage applied across the display is varied, but rather will remain constant in color regardless of variations in applied voltage.

A large range of different color variations are thus possible depending on the particular combination of dyes used. A preferred dye combination utilizes a red positive azo dye such as Mitsui SI-426 and a yellow negative anthraquinone dye:

1,8 Bis-(4-butylbenzamido)-4,5-Bis-(4-butylbenzoyloxy)-3-methylanthraquinone which produces yellow colored display in the "on" state and a red colored background in the "off" state. Some of the preferred dyes are discussed in detail in U.S. Pat. No. 4,933,104, also incorporated by reference herein. For light shutter applications, the selected dye combination can produce a color variation from one color to the other, while also producing color combinations of the two. For example, a liquid crystal display using the preferred dyes changes from a red color to a yellow color and various shades of orange in between. Other contemplated examples utilize blue and yellow dyes which produce shades of green, or a combination of a red and blue dye producing either color or various shades of purple.

The dye-based embodiment of the invention offers the ability to custom color-coordinate the watch dial, or other item, with specific outfits or customize the color depending on a variety of other criteria. For example, the owner of a blue-to-red liquid crystal display watch face could customize the color of the watch dial from blue to various shades of purple to red via an accessible voltage regulating dial. Similarly, a blue-to-yellow watch could be customized or controlled by the customer to display blue, yellow, or various shades of green. Alternatively, the present two-color liquid crystal display watch could be customized or controlled by the user to oscillate at a predetermined frequency between the two colors.

Another type of multi-color display that may be realized in accordance with the present invention is a display that uses positive dyes with colored polarizers. Such display technology involves mixing a positive order parameter dye in a liquid crystal host that is placed in a conventional 7–8 micron thick LCD. The system is designed to change from the color of the dyes in the "off" state to a color of the transmissive polarizer in the "on" state.

An LCD made with positive dyes and colored polarizers comprises a conventional twisted-nematic display with a 90 degree orientation difference between the alignment layer of the top of the LCD with respect to the bottom layer. A liquid crystal host that may be used for this purpose is ZLI-1840 (E. Merck). The amount of cholesteric required for such application is the same the manufacturer currently uses in conventional twisted nematic displays (not to exceed approximately 0.15%).

With an LCD of this type (positive dye with colored polarizer), a conventional reflective rear polarizer is placed on the display in an orientation to maximize the apparent color of the positive dye in the LCD. A second colored (or neutral) transmissive polarizer is then placed on the top of the LCD with an orientation perpendicular to that of the reflective rear polarizer. In light exhibiting UV-blocking characteristics at the top polarizer, a UV-blocking film is usually not required.

Still an additional type of colored LCD that may be used with the invention is a Twisted-Nematic Display with Retardation Film. Such a display combines a retardation film with a conventional 7–8 micron thick twisted nematic LCD to produce a display capable of changing from one color to another. A birefringent retardation film (RF) provides for the color change. When placed between two crossed neutral-grey polarizers, the RF produces interference colors when light passes through the different birefringent axis of the film. In practice, the RF is supplied by the manufacturer as a composite film (consisting of a transmissive polarizer laminated to a retardation film) which is applied to the top of the LCD (Note: this composite film is more commonly used to remove color in super twisted nematic displays); a conventional reflective polarizer is attached to the bottom of the LCD.

Twisted-nematic displays with retardation films as described above are limited, in part, to being able to produce only complementary colors. However, one is able to increase the number of color combinations by using a transmissive colored polarizer in place of a neutral-grey polarizer, as further described below.

For each retardation film/transmissive polarizer combination made by the manufacturer, two types of displays can be made based on the orientation of this composite film with respect to the reflective polarizer. For example, a composition consisting of a retardation film laminated to a red colored polarizer, with a conventional reflective polarizer attached to the bottom of the LCD, produces yellow characters on a red background when oriented to produce a negative image LCD display, or red characters on a yellow background when oriented to produce a positive image LCD display.

Yet a further type of LCD that may be used with the invention involves the use of positive and negative dyes, as discussed above, and as taught, e.g., in the referenced '301 patent. This LCD technology uses a combination of dichroic dyes, known as positive order parameter and negative order parameter dyes, to produce a display that changes from one color to another, with the positive dye supplying the "off" color and the negative dye, the "on" color. Voltages between "off" and "on" provide intermediate colors. The LCD is conventional, but thicker (approx. 12 micron) to accommodate the desired percentages of dichroic dyes. The dye-containing liquid crystal material (e.g., ZLI-1840; E. Merck) is filled in the same fashion as with typical twisted nematic LCD's, but the fill times may be longer due to increased viscosity. A conventional reflective polarizer is placed on the bottom of the LCD. A top polarizer is not needed.

Still an additional type of multi-color LCD display usable with the present invention comprises screen printed translucent inks. Such screen-printing translucent inks are placed directly onto the back glass of the display. When appropriate thicknesses of the screen-printed inks are used, LCDs employing this technique exhibit a bright, colorful appearance, since the inks are not located behind the back polarizer. In contrast, more-conventional screen-printed inks are usually essentially opaque and are most often placed directly on the back reflective polarizer (between the polarizer and the reflector) so as to have a muted, or dark appearance. Advantageously, translucent inks may be used in combination with any of the other types of LCD displays described herein to increase the variety of possible color combinations.

Returning to FIG. 1 and FIG. 2, the watch 10 includes a watch case 12 and a multi-color liquid crystal display module 15. The illustrated embodiment also has a hole or aperture 18 drilled through the liquid crystal display module 15 through which mechanical hour and minute hands 16 extend to present an indication of time in an analog form. The hole or aperture 18 can be drilled through a small amount of epoxy 22 that is placed in the center of the liquid crystal display module 15 or, preferably, the hole 18 may be drilled through a small empty chamber created in the display. Such small empty chamber, if used, comprises a very small percentage of the entire display. The liquid crystal display module 15 would then be placed in an analog watch 10 with the liquid crystal display module 15 serving as the watch dial and the hands 16 of the analog watch 10 going through the hole 18 in the liquid crystal display module 15.

Where combinations of dichroic dyes, e.g., as positive order parameter and negative order parameter dyes, are used to realize the liquid crystal display module 15, the user effectively controls a variable potentiometer which adjusts the magnitude of the voltage delivered across the entire liquid crystal display module 15, commonly referred to as the driving voltage or operating voltage. The potentiometer is contained within the liquid crystal control unit 29 which also is adapted to control other parameters of the liquid crystal display driver. In the illustrated embodiment, the liquid crystal material is ZLI-1840, commercially obtainable from E.M. Industries, which preferably utilizes an operating voltage between 1 volt or less (the "off" state and 2 volts (the "on" state). When the dyes in the liquid crystal guest-host mixture are positive and negative order parameter dyes, at 1 volt, the negative order parameter dye is relatively colorless and the positive order parameter dye is at full color, at 2 volts, the negative order parameter dye is at full color and the positive order parameter dye is relatively colorless, and at voltages intermediate between 1 volt and 2 volts, both positive and negative order parameter dyes are partially colored (between colorless and full color) at the same time, and the resulting color exhibited by the liquid crystal display will be a combination of the partially colored dyes. If, for example, one dye at full color is blue, and the other dye at full color is yellow, various shades of green will result at voltages intermediate 1 volt and 2 volt.

When the dyes in the liquid crystal guest-host mixture are positive and zero order parameter dyes, at 1 volt the positive order parameter dye is at full color and the zero order dye is at constant full color. The resulting color exhibited by the display cell will be a combination of the full color of the positive order parameter dye and the constant color of the zero order parameter dye. Thus, if the positive order parameter dye at full color is blue, and the constant color of the zero order parameter dye is yellow, at 1 volt or less applied voltage, the color exhibited will be a combination of blue and yellow, namely green. As the applied voltage across the display cell is raised, the green color will become lighter, namely more yellowish, and at full voltage across the display cell, the color thereof will be yellow.

When the dyes in the liquid crystal guest-host mixture are negative and zero order parameter dyes, at 1 volt the negative order parameter dye is relatively colorless and the zero order parameter dye is at constant full value. The resulting color exhibited by the display cell will be the color of the zero order parameter dye. When the voltage applied across display cell is raised to full operating value, the resulting color exhibited by the display cell will be a combination of the full color of the negative order parameter dye and the constant color of the zero order parameter dye. Thus, if the negative order parameter dye at full color is blue, and the constant color of the positive order parameter dye is yellow, at 1 volt applied voltage, the color exhibited will be yellow. As the applied voltage across the display cell is raised to full voltage, the yellow color will change to increasing deeper shades of green.

The user can also select the frequency of voltage oscillations to the voltage delivered across the liquid crystal display module 15 by adjusting another variable potentiometer also contained within the liquid crystal control unit 29. Oscillations in voltage across the display cell between the 1 volt and 2 volts will result in oscillations of color between the full color of one dye and the full color of the other dye and across blended colors between the two extreme full colors. In this manner, the user can select the frequency of color changes in the liquid crystal display 15 to attain the desired aesthetic effect.

Another feature of this and other embodiments is the liquid crystal display response times. Although response times for conventional liquid crystals vary significantly depending on the operating temperature, the typical response times of the liquid crystal display described herein are preferably between about 10–40 msec to turn the liquid crystal display to the "on" state and between about 20–50 msec to turn the liquid crystal display to the "off" state.

Figure 3:
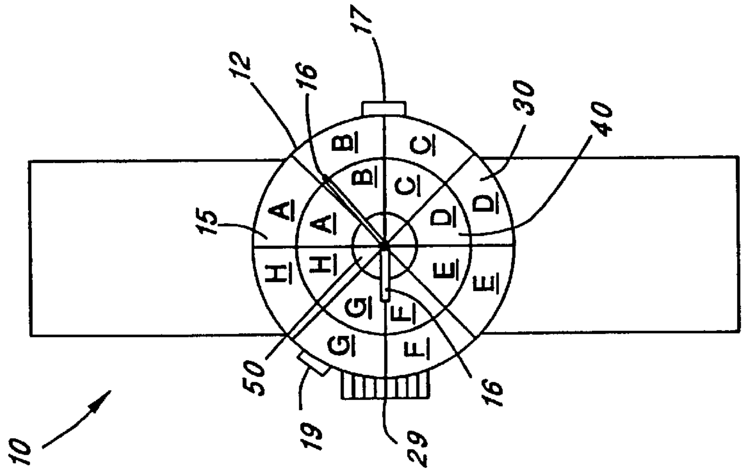
FIG. 3 shows another embodiment of the present invention, illustrating an analog watch having a single chamber liquid crystal display that dynamically forms a preselected color customized image on a color background when activated.

Referring next to FIG. 3, there is shown another embodiment of the present invention illustrating a conventional analog watch 10 that dynamically forms a preselected color customized image, such as the illustrated concentric circles, on a color background when activated. The watch 10 includes a watch case 12, a liquid crystal watch dial module 15, mechanical hands 16, an analog watch control button 17, a liquid crystal display mode control button 19, and control unit 29. The watch dial in this embodiment is a single chamber liquid crystal display module 15 that is made using any of the LCD technologies described above, e.g., a combination of a positive order parameter dye and a negative order parameter dye that preferably changes from a red color to a yellow color when activated in the manner described above. The watch 10 of FIG. 3, has eight identical segments A,B,C,D,E,F,G,H in each of the three concentric rings 30,40,50. Each of the eight segments A through H of the concentric rings 30,40,50 representing a forty five degree arc of the circular watch dial.

In this illustrated embodiment, the preferred combination of dyes are used to produce, for example, sequentially activated yellow segments (Segments 30A through 30H followed by segments 40A through 40H and 50A through 50H) on a red colored background. Alternatively any of the concentric rings 30,40,50 can be changed from a red color to a yellow color if all segments (A through H) within the concentric ring are simultaneously activated.

In the illustrated embodiments, as well as other described embodiments of the present invention, the liquid crystal displays each have a transparent substrate which is preferably glass and one or more transparent electrodes which are preferably films of indium-tin-oxide (ITO) that are deposited in prescribed orientations on the interior surfaces of the substrates.

By virtue of its ability to effect simultaneous image and color change, the liquid crystal display watch face provides a practical and inexpensive format for generating a wide variety of pleasing and eye-catching dynamic images. These could include kaleidoscopic effects, animated images, geometric images, designer logos, or other recognizable images or characters, including sequences of such images, all of which may be displayed in a way that is generally independent of the time of day. By "independent of the time of day" it is meant that the displays are not designed to convey time-of-day information, even though, e.g., a given sequence of images may commence at a certain time of day, for example, as dictated by an alarm setting of the watch.

The preferred liquid crystal material is a conventional twisted-nematic liquid crystal material with positive dielectric anisotropy such as the aforementioned ZLI-1840. The liquid crystal displays preferably change from a non-scattering color to a different non-scattering color for typical twisted-nematic liquid crystal display applications. The present invention also contemplates the use of guest-host polymer dispersed liquid crystal (PDLC) displays or encapsulated liquid crystal (NCAP) displays as more fully disclosed in co-pending U.S. patent application Ser. No. 08/033,494 filed on Mar. 18, 1993, the disclosure of which is incorporated by reference herein.

The liquid crystal displays of the illustrated embodiments can be operated in a reflective mode, trans-reflective mode, or transmissive mode with or without a backlight. A reflective display system is preferred for most timepiece applications such as watches or clocks. The reflective display system preferably incorporates a reflective surface on the underlying substrate of the display. The highly reflective surface typically consists of a thin film of aluminum, silver, gold or other highly reflective material. Alternatively, a trans-reflective display system with a backlight means such as an electroluminescent display offers some very appealing aesthetic effects.

Figure 4:
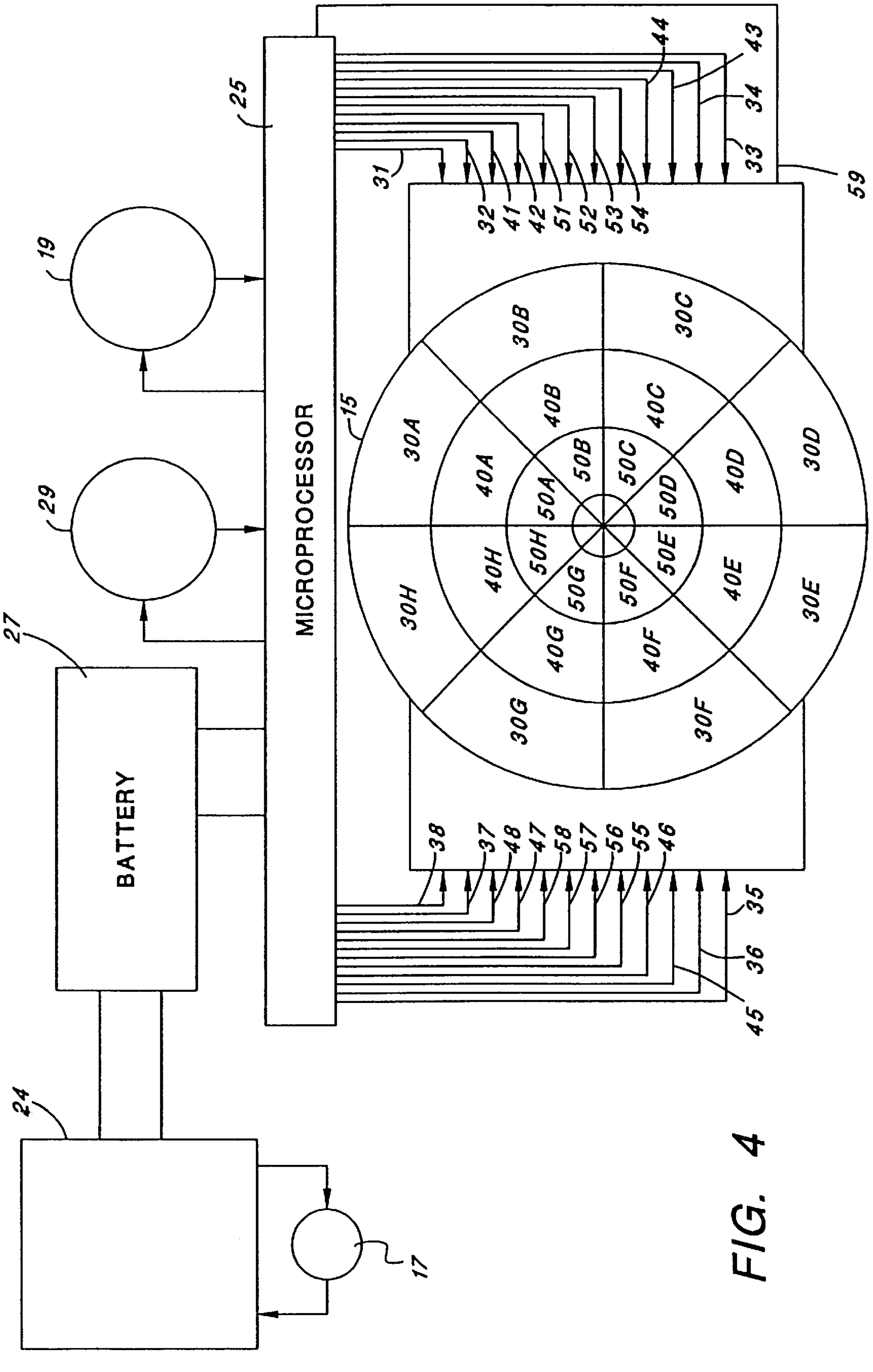
FIG. 4 is a block diagram of the embodiment illustrated in FIG. 3, generally depicting the plurality of electrical connections and driving means associated with the dynamically changing, multi-color liquid crystal display.

FIG. 4 shows a block diagram of the embodiment illustrated in FIG. 3 generally representing the plurality of electrical connections and the driving means associated with the liquid crystal display. In the illustrated embodiment there are twenty-four electrode segments corresponding to the desired image or images to be displayed are placed on the upper substrate of the liquid crystal display. In addition there is one common electrode conforming generally to the shape of the watch dial placed on the lower substrate. The portion of the liquid crystal material disposed between each of the transparent electrodes on the upper substrate and the single electrode on the lower substrate define a plurality of liquid crystal display segments.

Each of the twenty-four electrode segments segments 30A through 30H, 40A through 40H, and 50A through 50H, are individually connected to the microprocessor, as represented by electrical connections 31–38, 41–48, and 51–58, respectively. The common electrode is connected to the microprocessor by electrical connections 59. Input commands or signals to the microprocessor originate from the liquid crystal display mode control button 19 as well as the liquid crystal display control unit 29. A battery 27 is preferred power source for both the electronic timekeeping circuits 24 (quartz movement) and controlling the microprocessor 25 for the liquid crystal display 15. The plurality of electrode segments 30A through 30H, 40A through 40H, and 50A through 50H, on the upper substrate and the common electrode segment (not shown) on the lower substrate of the liquid crystal display 15 are selectively activated by the microprocessor 25 to establish electric fields of varying magnitudes which effectuates changes in each liquid crystal display segments between an active state and an inactive state. The prescribed voltages applied across the various electrodes may occur in a predetermined sequence so as to produce a desired sequence of color/image dynamic changes, thereby providing, e.g., an animated image. Alternatively, if desired, the color changes may occur in a more random fashion. Regardless of the driving mechanism, each liquid crystal display segments produces a first color when the liquid crystal display segment is placed in the inactive state and a second color when the liquid crystal display segments are placed in the active state. Advantageously, the liquid crystal display segments and the images that are displayed may be independent of the time of day.

The driving electronics comprises a 4 or 8 bit microprocessor, which has a built-in liquid crystal driving mechanism, as is generally known in the art. The embodiments of the dynamically changing, multi-color liquid crystal display can be adapted to operate in a static or single level multiplexing (i.e. full duty cycle), 2 level multiplexing (½ duty cycle), 3 level multiplexing (⅓ duty cycle), or even 4 level multiplexing (¼ duty cycle). For more intricate displays, it may be desirable to produce an application specific integrated circuit tailored to the liquid crystal display dynamics.

Figure 5:
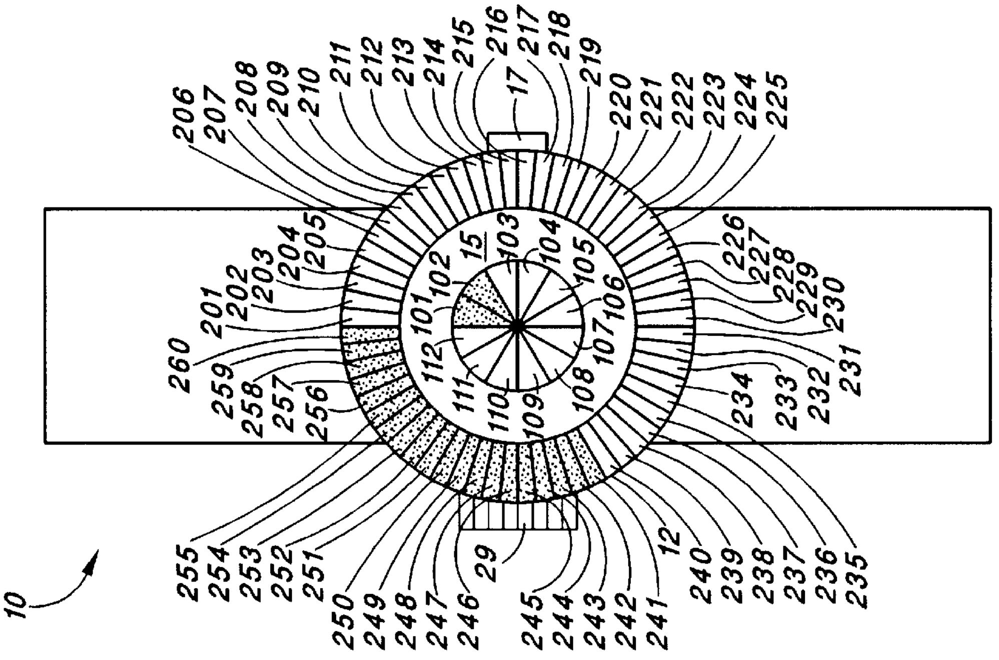
FIG. 5 illustrates an electronic watch having a single chamber liquid crystal display and a plurality of electrode segments that dynamically simulates the indicated time in analog form in accordance with the present invention.

FIG. 5 illustrates an embodiment of the present invention that includes a watch case 12 and a multi-color liquid crystal display 15 which presents time information in a substantially conventional format. Like, the previous embodiments, the watch 10 includes a watch case 12, a liquid crystal watch display module 15, an timekeeping control button 17, and a liquid crystal display control unit 29. The multi-color liquid crystal display module 15 also includes sixty liquid crystal display elements, 201 through 260, on the outer periphery of the liquid crystal display module 15 to provide an indication of minutes. The liquid crystal display module 15 further includes an inner circle of twelve display elements, 101 through 112, which provide an appropriate indication of the present hour. In the illustrated embodiment the time presented is 2:40 and is characterized by activating the inner liquid crystal display elements 101 and 102 (i.e. in an "on" state) while maintaining the rest of the inner liquid crystal display elements, 103 through 112, in an "off" state. On the outer periphery, the display elements 201 through 240 are inactive while display elements 241 through 260 are active. By using a combination of dyes, as described above, the active elements in the illustrated embodiment are displayed in a first color, preferably red, while the inactive display elements appear as a second color, such as yellow.

The exact number of display elements in the inner circle and outer periphery can be tailored for various watch designs. For example, a twenty four element inner display may be appropriate for individuals who regularly use military time. Similarly, the outer periphery may be limited to twenty or twelve display elements where the exact minute is not of particular importance. The present embodiment also has appropriate controls accessible by the individual to control certain aspects of the liquid crystal display such as present time indication, shades of the presented colors, etc.

Figure 6:
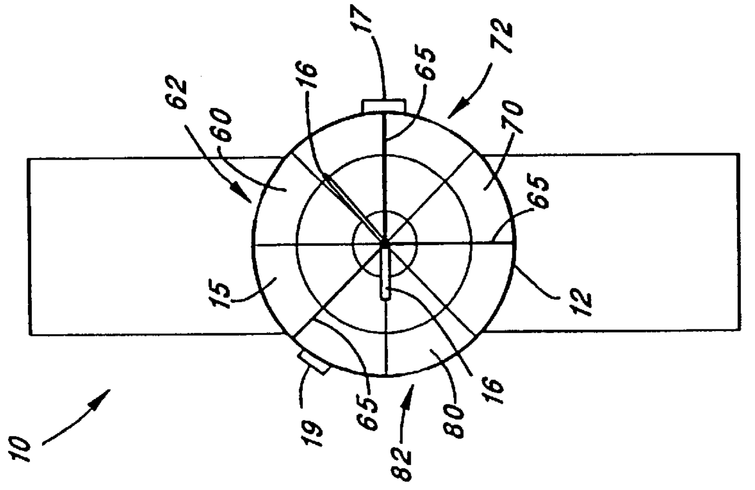
FIG. 6 shows an embodiment of the present invention illustrating a conventional analog watch having a multi-chamber liquid crystal display wherein each chamber dynamically changes from one color to another color.

In other embodiments, illustrated generally in FIG. 6, the use of the guest-host liquid crystal display method offers a very unique appearance, since several different guest-host liquid crystal mixtures could be filled into one liquid crystal display module having a plurality of separate chambers 60,70,80. The chambers 60,70,80 are sealed from one another with an epoxy material 65 disposed within the liquid crystal display 15. Much like the previously discussed embodiments, the watch 10 of FIG. 6 includes a watch case 12, a liquid crystal watch display module 15, mechanical hands 16, an analog watch control button 17, and a liquid crystal display control button 19 which are operatively associated with internally placed electronic timekeeping circuits and the liquid crystal display microprocessor, respectively. Each of the separate chambers 60,70,80 also has a separate fill port 62,72,82 at the outer periphery of each chamber. A different guest-host mixture which contains dyes with different properties (i.e. different colors and positive order, zero order, or negative order parameters) would preferably fill each of the separate chambers 60,70,80. The resulting effect is a liquid crystal display module 15 that produces an aesthetically pleasing appearance with a multitude of different colors changing into other colors with the application of a voltage to the various electrodes within each chamber of the liquid crystal display system.

The observed effect would be for example, a liquid crystal display that has one chamber 60 that contains fluid that changes from blue to yellow, while another chamber 70 contains fluid that changes from red to blue, and another chamber 80 contains fluid that changes form yellow to purple. The combination of these different mixtures within a single liquid crystal display system, coupled with appropriate electronic driving method results in a unique aesthetic appearance not achievable with any other existing low cost liquid crystal display technology.

Figure 7:
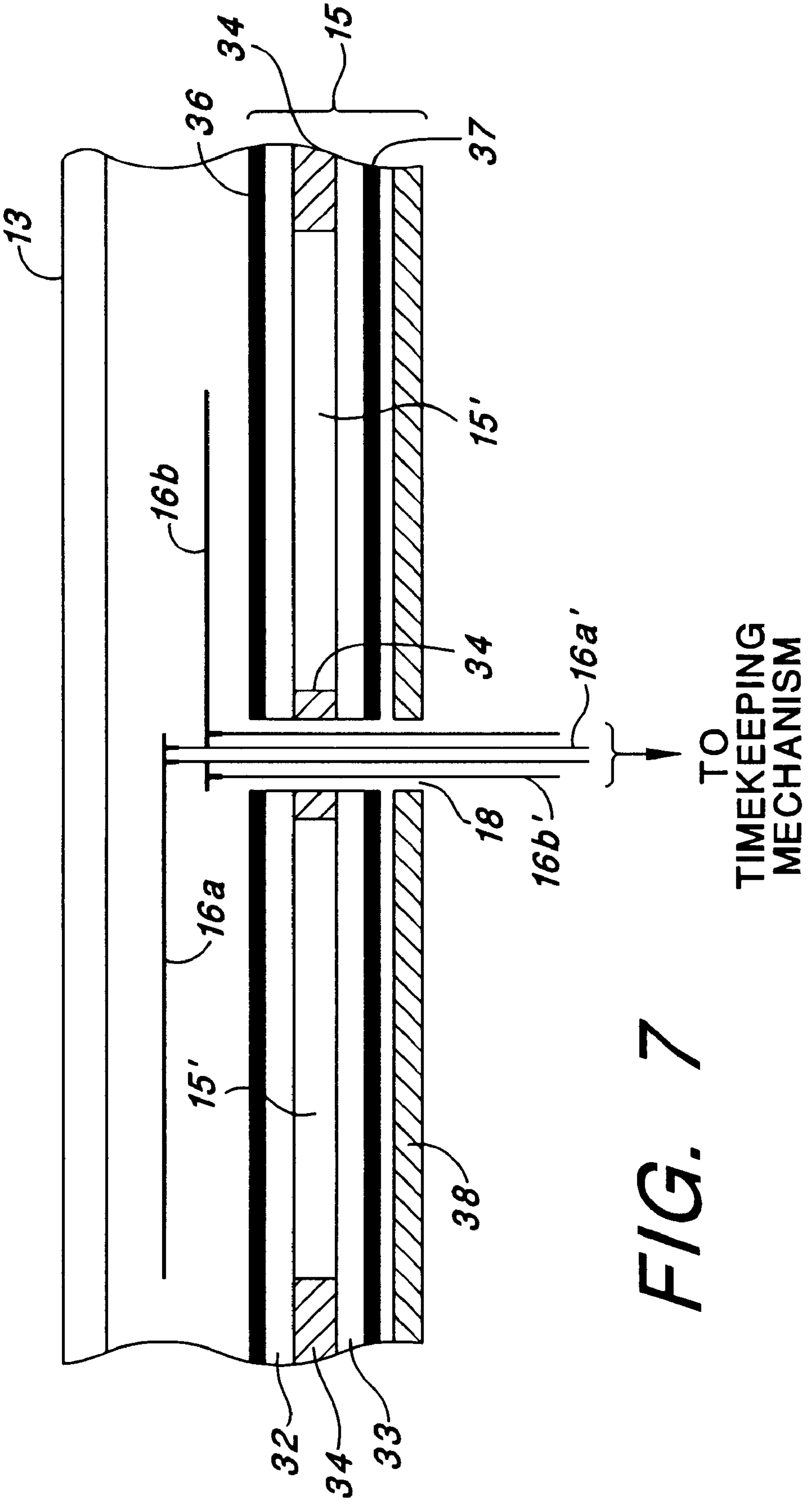
FIG. 7 shows a diagrammatic sectional view of a watch having a watch module that provides a multi-color liquid crystal display in accordance with one embodiment of the invention.

Turning next to FIG. 7, there is shown a diagrammatic sectional view of a watch 10 made in accordance with the present invention to illustrate a constructional example of the invention. The watch 10 includes a multi-color LCD module 15 having an aperature 18 through its center. Conventional analog timekeeping drives 16*a*' and 16*b*', coupled to a conventional timekeeping mechanism, pass through the aperature 18 and support a minute hand 16*a* and an hour hand 16*b*, in conventional manner. A transparent cover 13 is placed over the time-indicating hands 16*a* and 16*b*.

The makeup of the LCD display module 15 will vary somewhat depending upon the type of LCD technology that is employed therein. In general, the module includes a transparent front plate 32, a transparent rear plate 33, and a spacer 34. The spacer 34 in cooperation with the plates 32 and 33 delimits a closed space located between the plates wherein a layer 15' of liquid crystal may be placed. Such layer 15' may be, e.g., a liquid crystal having a positive dielectric anistotropy, or any of the other types of liquid crystals known in the art, or described herein. The spacer 34 may be shaped into various patterns, as desired, to form different chambers or segments for different liquid crystals, within the space between the plates 32 and 33, e.g., liquid crystals that respond to applied potentials to create different colors.

The module 15 may further include a front polarizer 36 and a rear polarizer 37, located one on each side of the assembly created by the plates 32 and 33. The optical axes of the polarizers is parallel to each other. In some embodiments, as described above, the polarizers may not be needed, particularly the front polarizer. The use of polarizers is dependent upon the type of liquid crystal 15' that is used.

The module 15 finally includes a rear reflective wall 38. The surface of this wall 38 that faces the plates 32 and 33, and the polarizers 36 and 37 (when used), is light-reflective and diffusing. The color and opacity of the module 15, i.e., the observed color and opacity of the liquid crystal 15' may be controlled by application of an electric field.

Note shown in FIG. 7, but understood to be present, are appropriate electrodes, on the interior faces of the plates 32 and 33, that define liquid crystal display segments and which provide a means for applying the changing electric field that modifies the optical characteristics of the liquid crystal between the plates, as is known in the art.

The present invention and its advantages will be understood from the foregoing description, and it will be apparent that various changes may be made in the form, construction and arrangement of the parts thereof without departing from the spirit and scope of the invention or sacrificing all of its material advantages, the forms hereinbefore described being merely exemplary embodiments thereof. For example, the multi-color, dynamically changing liquid crystal display is contemplated for use in many designer apparel items, novelty items, instrument displays, touchpanels, light filters color shutters, toys, and other consumer products.

To that end, it is not intended that the scope of the invention be limited to the specific embodiments illustrated and described. Rather, it is intended that the scope of this invention be determined by the appending claims and their equivalents.

What is claimed is:

1. A watch having a multi-colored watch face comprising:

a liquid crystal display (LCD) watch face made from at least one multi-color LCD segment;

a timepiece operatively coupled to the LCD watch face that provides an indication of the time of day on the LCD watch face;

control means for dynamically controlling the color of the LCD watch face so that color changes occur in at least a portion of the watch face independent of the time of day; and a power source for providing operating power to the electronic timepiece and control means.

2. The watch as set forth in claim 1 wherein the control means includes means for controlling the color changes that occur in at least a portion of the LCD watch face so that such color changes occur in a predetermined sequence that provides a dynamically changing image.

3. The watch as set forth in claim 2 wherein the control means includes means for controlling the color changes that occur in at least a portion of the LCD watch face so that such color changes occur in a predetermined sequence that provides a dynamically changing kaleidoscopic effect.

4. The watch as set forth in claim 2 wherein the control means includes means for controlling the color changes that occur in at least a portion of the LCD watch face so that such color changes occur in a predetermined sequence that provides a dynamically changing logo or similar recognizable image or character.

5. The watch as set forth in claim 1 wherein the watch face has a sealed aperture therethrough, and wherein the watch further includes time-indicating hands operatively associated with the timepiece through the sealed aperture such that movement of the time-indicating hands provides an indication of the time of day.

6. The watch as set forth in claim 1 wherein the at least one multi-color LCD segment of the watch face includes positive dyes and colored polarizers.

7. The watch as set forth in claim 1 wherein the at least one multi-color LCD segment of the watch face includes a twisted-nematic LCD and a retardation film.

8. The watch as set forth in claim 1 wherein the at least one multi-color LCD segment of the watch face includes positive and negative dyes.

9. The watch as set forth in claim 1 wherein the at least one multi-color LCD segment of the watch face includes screen-printing translucent inks.

10. A dynamically changing, multi-color liquid crystal display for designer apparel items comprising:

two generally parallel substrates having interior facing surfaces;

a plurality of electrodes disposed on the interior faces of the substrates that define liquid crystal display segments;

a liquid crystal material disposed between the two substrates; and electronic control means for applying prescribed voltages across the electrodes of selected liquid crystal display segments in a sequence that is independent of the time of day;

wherein the liquid crystal display segments exhibit selected color changes in response to the prescribed voltages applied across the selected liquid crystal display segments by the electronic control means.

11. The dynamically changing, multi-color liquid crystal display for designer apparel items comprising:

two generally parallel substrates having interior facing surfaces;

a plurality of electrodes disposed on the interior faces of the substrates that define liquid crystal display segments;

a liquid crystal material disposed between the two substrates;

said plurality of electrodes defining a multi-chamber liquid crystal display having a plurality of sealed chambers including liquid crystal display segments for each chamber;

electronic control circuitry for applying prescribed voltages across the electrodes of selected liquid crystal display segments for changing the perceived color of each liquid crystal display segment in a sequence that is independent of the time of day;

wherein the liquid crystal display segments within each chamber exhibit selected color changes in response to the prescribed voltages applied across the selected liquid crystal display segments by the electronic control means.

* * * * *